United States Patent [19]

Wright

[11] 3,760,873
[45] Sept. 25, 1973

[54] PLATE HEAT EXCHANGERS
[75] Inventor: Felix William Wright, Copthorne Bank, near Crawley, England
[73] Assignee: The A.P.V. Company Limited, Sussex, England
[22] Filed: Feb. 24, 1972
[21] Appl. No.: 228,914

[52] U.S. Cl. .............................................. 165/166
[51] Int. Cl. .............................................. F28f 3/00
[58] Field of Search ................................... 165/166

[56] References Cited
UNITED STATES PATENTS
3,179,165  4/1965  Usher et al. .................... 165/166
3,195,625  7/1965  Thomson ......................... 165/166

Primary Examiner—Charles Sukalo
Attorney—Conrad Christel et al.

[57] ABSTRACT

A heat exchanger plate has an unperforated port portion to separate passes. This portion is reinforced by a reinforcement having edge formations whereby the effect of an annular diaphragm around the reinforcement is avoided. In a preferred form, the inner wall of a gasket recess surrounding the port portion is formed with alternating zones of local widening, cooperating with the lobes or full diameter zones of the reinforcing element, and normal width zones cooperating with reduced diameter zones of the reinforcing element, with reinforcing ribs to strengthen the widened space between the reinforcing element and the inner wall of the gasket recess.

10 Claims, 3 Drawing Figures

PLATE HEAT EXCHANGERS

This invention relates to plate heat exchangers.

Heat exchanger plates normally have ports perforated in the four corners of the plate to allow for the flow of the process liquids (heat exchange media), but when it is required to arrange the plates in more than one pass it is necessary to leave one of the ports unperforated in certain plates in order to separate the adjacent passes and cause a change of flow direction at the changeover between two passes.

This unperforated port will therefore be subject to a pressure differential equal to the sum of the pressure drops in each of the adjacent passes, and may also be subject to hydrodynamic pressure surges during starting up.

Recent trends in heat exchangers have called for much larger ports to handle the high flows required, and it has been found that the weakness of the unperforated port, arising as a result of its comparatively large diameter and the use of comparatively thin materials, may allow appreciable deflection under the pressure differential involved.

Our United Kingdom Pat. Specification 1207016 describes and claims a heat exchanger plate having an unperforated port zone therein adapted to be aligned with perforated ports in similar plates in a pack, the said unperforated port zone being surrounded by a gasket recess with a base adapted to contact the sealing face of a gasket on an adjacent plate, the said unperforated port zone being provided with a reinforcing element secured to the plate and having a flat zone for engagement with an adjacent plate.

In a practical embodiment of the invention forming the subject of that specification, a disc or ring is welded to the plate to form the reinforcing element.

It has now been found that using a disc or ring, there is left an annulus between the disc or ring and the wall of the gasket recess which, being thin and uncorrugated, is a zone of structural weakness. In operation it tends to act as an annular diaphragm connecting the relatively stiffer reinforced part and gasket recess wall.

According to the invention, the zone between the reinforcing element and the inner wall of the gasket recess is interrupted by reinforced or corrugated parts.

The line of weakness is thus broken up and the said zone cannot act as an annular diaphragm.

Preferably, the reinforcing element and the inner wall of the gasket recess is interrupted by reinforced or corrugated parts.

In a preferred form of the invention, the inner wall of the gasket recess is formed with alternating zones of local widening, cooperating with the lobes or full diameter zones of the reinforcing element, and normal width zones cooperating with reduced diameter zones of the reinforcing element, with reinforcing ribs to strengthen the widened space between the reinforcing element and the inner wall of the gasket recess.

In use, the pack of plates would have the plates arranged with the zones of local widening located opposite zones of normal width in the adjacent plates to give interplate support in the pack. This may also apply to the plates with perforated port zones.

The invention also consists in a plate heat exchanger having a pack of plates with such gasket groove arrangements at the port zones.

The invention will be further described with reference to the accompanying drawings, in which.

Figure 1:
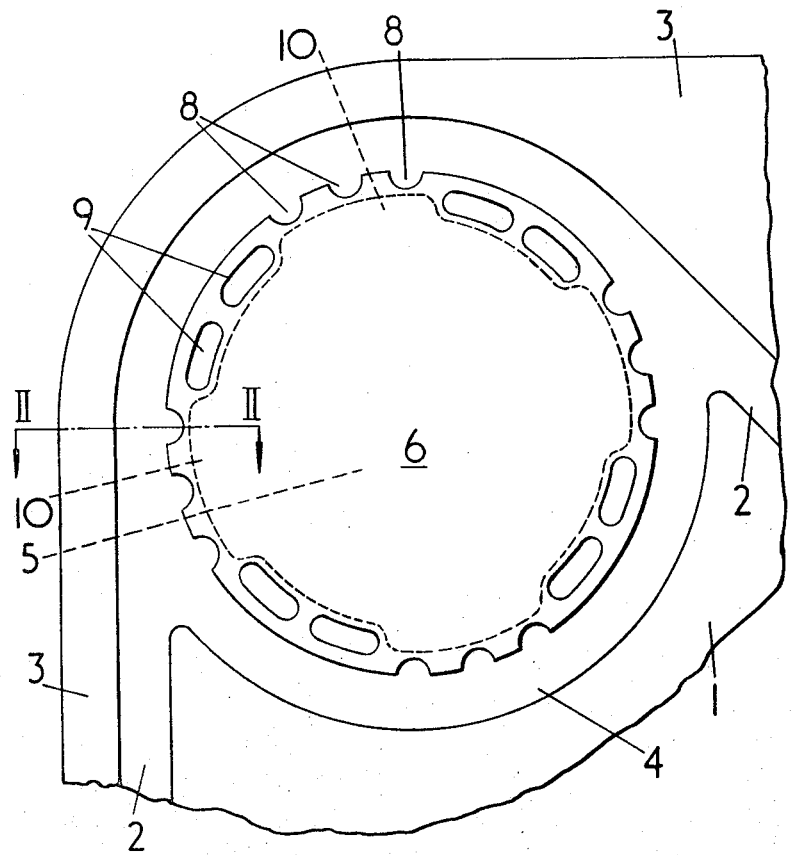
FIG. 1 is an elevation of a corner portion of one preferred form of plate according to the invention.
Figure 2:
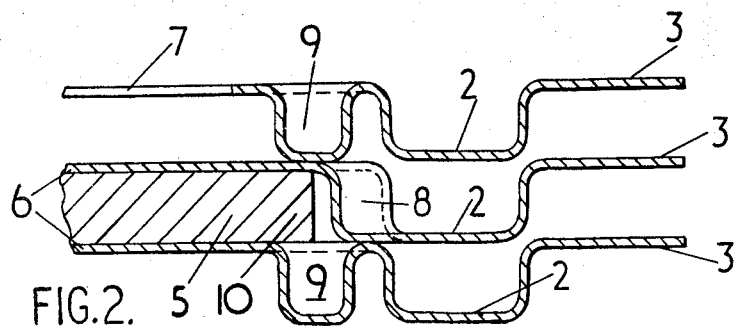
FIG. 2 is a section to an enlarged scale on the line II—II of FIG. 1, showing portions three adjacent plates.

FIG. 1 of the drawing shows a corner portion of a heat exchanger plate showing part of a flow space area 1, parts of a peripheral gasket groove 2 and part of a peripheral portion 3 of the plate. The gasket groove 2 has an extension portion 4 running inside an unperforated port zone or blank 6 which has a reinforcing member 5 welded thereon. FIG. 2 shows portions of three plates, in two of which the port zone is shown in the form of a port blank 6, and in the third of which the port zone has been perforated at 7.

It can be seen from FIG. 1 that the inner wall of the gasket groove 2, where it encircles the port zone, and of the gasket groove extension 4 which cooperates with this corner portion of the gasket groove, is of two distinct forms which alternate with one another in zones. One form of zone is achieved by repeated local widening of the gasket groove as at areas 8 (as also illustrated on the middle plate of FIG. 2), and the other form is of constant width of the gasket groove and extension. In the zones of constant width a pair of depressions 9 is formed adjacent the inner wall of the gasket groove as illustrated in section on the two outside plates of FIG. 2.

The reinforcing element 5 is in the form of a four lobed disc with each of the lobes 10 corresponding and cooperating with a zone of intermittent widening, and the smaller diameter portions of the disc between the lobes corresponding with zones of the wall having the depressions 9.

It can be seen that the effect of the zones of widening 8 cooperating with the lobes 10 of the reinforcing element 5 is to limit the width of the zone weakness between the gasket wall and the reinforcing element, and that the depressions 9 fall into the annular zone including this zone of weakness so that there is no circular line of weakness extending right round the reinforcing element 5.

It can further be seen, particularly from FIG. 2, that the intermittent widening of the gasket groove at 8 enables the inner wall of the gasket groove to give mechanical interplate support in the zone of the gasket wall, and that the depressions 9 also cooperate with the surface of the adjacent plate to provide such interplate support. This support extends right through the pack, and tends to prevent distortion of the plates in the region of the port zones.

As in the United Kingdom Pat. Specification 1207016, the reinforcing element bears on the metal of the adjacent plate and provides reinforcement for the unperforated port zone.

Figure 3:
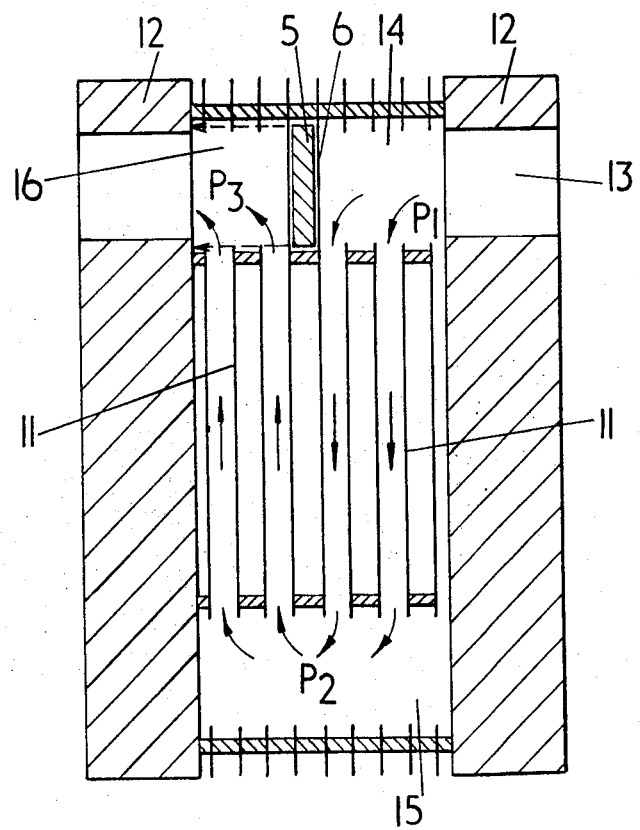
FIG. 3 is a diagrammatic illustration of a pack of plates forming a plate heat exchanger.

FIG. 3 shows a simple form of plate pack in diagrammatic section through the product feed and discharge ports. The plates 11 are shown supported between frame members 12. The product to be treated is fed in at 13 at a pressure $p_1$ to a feed port 14 which ends in a port blank 6 supported by a reinforcing member 5 located between the port blank 6 and a similar blank on the adjacent plate. The product flows down the pass to a port 15 where a pressure $p_2$ prevails and then returns up the next pass to the continuation 16 of the port beyond, the blanks 6, where a discharge pressure $p_3$ prevails. It can be seen that the pressure force on the blanks 6 and member 5 is $(p_1-p_3)$ multiplied by the effective area of the port.

Various modifications may be made within the scope of the invention.

Thus, in one variation, the gasket groove could be formed of alternatively wide and narrow portions, so that the inner wall undulated e.g. with four wide and four narrow portions and the reinforcing element could then be in the form of a four lobed disc with the lobes cooperating with the narrow portions of the gasket groove. The number of widened portions could be increased up to the limit of pressability of the plate material, and in each case the periphery of a reinforcing element could be provided with an indentation cooperating with the widening of the gasket groove.

In a further variation, the depressions 9 could be omitted from the illustrated embodiment, and the reinforcing element made so that the lobes followed quite closely the narrow parts of the gasket groove, while the portion of lesser diameter followed quite closely the intermittently widened portions. In a further variation, the gasket groove could be formed with alternating zones of intermittent widening, with some of the zones having a greater degree of widening than the intervening zones. The outer contour of the reinforcing element could then follow fairly closely the lines of the inner limits of widening.

Further, additional reinforcing discs may be affixed to the blank zones 6.

I claim:

1. In a heat exchanger plate having an unperforated port zone therein adapted to be aligned with perforated ports in similar plates in a pack, the said unperforated port zone being surrounded by a gasket recess having inner and outer walls and a base adapted to contact the sealing face of a gasket on an adjacent plate, the said unperforated port zone being provided with a reinforcing element secured to the plate and having a flat area for engagement on an adjacent plate: the improvement that a zone of the plate defined between the inner wall of the gasket recess and the reinforcing element is interrupted by reinforced and corrugated parts.

2. A heat exchanger plate as claimed in claim 1, in which the flat area is substantially coplanar with the said base.

3. A heat exchanger plate as claimed in claim 1, in which the reinforcing element is in the form of a disc having areas of increased diameter.

4. A heat exchanger plate as claimed in claim 1, in which the inner wall of the gasket recess is formed with zones of local widening of the recess.

5. A heat exchanger plate as claimed in claim 4, in which each zone of the local widening comprises a plurality of small areas of local widening.

6. A heat exchanger plate as claimed in claim 5, in which the reinforcing element is in the form of a disc having areas of increased diameter and intervening areas of a reduced diameter.

7. A heat exchanger plate as claimed in claim 6, in which the zones of local widening of the gasket recess cooperate with the areas of increased diameter, and the intervening zones of the gasket recess cooperate with the areas of the reinforcing element of reduced diameter, and in which there provided additional reinforcing formations in the plates between the inner wall of the gasket recess and the areas of reduced diameter of the reinforcing element.

8. In a heat exchanger comprising a pack of plates including at least one plate having an unperforated port zone therein adapted to be aligned with the perforated ports in the other plates in the pack, the said unperforated port zone being surrounded by a gasket recess having inner and outer walls and the base adapted to contact the sealing face of a gasket on the adjacent plate, the said unperforated port zone being provided with the reinforcing element secured to the plate and having a flat area for engagement on the adjacent plate: the improvement that the zone of the plate with the unperforated port zone between the reinforcing element and the inner wall of the gasket recess is interrupted by reinforced and corrugated parts.

9. A heat exchanger as claimed in claim 8, in which at least one of the port zones of each of the plates includes a gasket recess having an inner wall with zones of local widening spaced by zones of normal width, adjacent plates in the pack being so formed tht the zones of local widening align with zones of normal width in the adjacent plates to provide interplate support.

10. A heat exchanger as claimed in claim 9, in which the zones of normal width are associated with additional reinforcing ribs for interplate support with zones of local widening.

* * * * *